United States Patent
Kern et al.

(10) Patent No.: US 8,897,134 B2
(45) Date of Patent: Nov. 25, 2014

(54) NOTIFYING A CONTROLLER OF A CHANGE TO A PACKET FORWARDING CONFIGURATION OF A NETWORK ELEMENT OVER A COMMUNICATION CHANNEL

(75) Inventors: Andràs Kern, Budapest (HU); Dàvid Jocha, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 334 days.

(21) Appl. No.: 12/971,647

(22) Filed: Dec. 17, 2010

(65) Prior Publication Data

US 2011/0317559 A1 Dec. 29, 2011

Related U.S. Application Data

(60) Provisional application No. 61/358,455, filed on Jun. 25, 2010.

(51) Int. Cl.
*H04L 12/26* (2006.01)
*H04L 12/24* (2006.01)
*H04L 12/751* (2013.01)

(52) U.S. Cl.
CPC ............ *H04L 41/0816* (2013.01); *H04L 45/02* (2013.01)
USPC .......................................... 370/235; 370/254

(58) Field of Classification Search
USPC ......... 370/356, 373, 377, 384, 385, 410, 426, 370/229, 237, 395.32, 220, 422, 235, 2, 54
See application file for complete search history.

(56) References Cited

U.S. PATENT DOCUMENTS

| | | | | |
|---|---|---|---|---|
| 5,309,433 | A | * | 5/1994 | Cidon et al. .................... 370/390 |
| 5,421,004 | A | * | 5/1995 | Carpenter et al. ............... 714/25 |
| 5,488,609 | A | * | 1/1996 | Hluchyj et al. ................. 370/232 |
| 5,544,316 | A | * | 8/1996 | Carpenter et al. ............ 719/310 |
| 5,617,421 | A | * | 4/1997 | Chin et al. ...................... 370/402 |
| 5,752,003 | A | * | 5/1998 | Hart ............................... 709/223 |
| 6,041,166 | A | * | 3/2000 | Hart et al. ....................... 709/238 |
| 6,111,894 | A | * | 8/2000 | Bender et al. .................. 370/469 |
| 6,201,962 | B1 | * | 3/2001 | Sturniolo et al. ........... 455/432.2 |
| 6,269,404 | B1 | * | 7/2001 | Hart et al. ....................... 709/238 |
| 6,347,090 | B1 | * | 2/2002 | Ooms et al. .................... 370/428 |

(Continued)

OTHER PUBLICATIONS

McKeown, Nick et al., "OpenFlow: Enabling Innovation in Campus Networks", Mar. 14, 2008, 6 pgs.*

(Continued)

*Primary Examiner* — Paul H. Masur
*Assistant Examiner* — Michael Phillips
(74) *Attorney, Agent, or Firm* — Blakely Sokoloff Taylor & Zafman, LLP

(57) ABSTRACT

A method performed by a network element, for notifying a controller of a change to a packet forwarding configuration of the network element. The network element is separated from the controller by a communication channel. The method includes determining the change to the packet forwarding configuration of the network element. The packet forwarding configuration specifies how packets are to be forwarded by the network element. The method also includes actively notifying the controller of the change to the packet forwarding configuration by sending a message to the controller over the communication channel. The message, in addition to indicating the change, also indicates at least one detail about the packet forwarding configuration after the change.

24 Claims, 7 Drawing Sheets

(56) References Cited

U.S. PATENT DOCUMENTS

| | | | |
|---|---|---|---|
| 6,401,218 B1* | 6/2002 | Linam et al. | 714/25 |
| 6,480,901 B1* | 11/2002 | Weber et al. | 709/246 |
| 6,480,955 B1* | 11/2002 | DeKoning et al. | 713/100 |
| 6,496,510 B1* | 12/2002 | Tsukakoshi et al. | 370/401 |
| 6,501,741 B1* | 12/2002 | Mikkonen et al. | 370/310 |
| 6,574,201 B1* | 6/2003 | Kreppel | 370/328 |
| 6,577,628 B1* | 6/2003 | Hejza | 370/392 |
| 6,584,499 B1* | 6/2003 | Jantz et al. | 709/220 |
| 6,625,658 B1* | 9/2003 | Oguchi et al. | 709/238 |
| 6,704,752 B1* | 3/2004 | Kathail et al. | 1/1 |
| 6,724,734 B1* | 4/2004 | Shabtay et al. | 370/254 |
| 6,728,214 B1* | 4/2004 | Hao et al. | 370/241 |
| 6,765,927 B1* | 7/2004 | Martin et al. | 370/469 |
| 6,768,740 B1* | 7/2004 | Perlman et al. | 370/392 |
| 6,769,022 B1* | 7/2004 | DeKoning et al. | 709/223 |
| 6,775,280 B1* | 8/2004 | Ma et al. | 370/392 |
| 6,807,175 B1* | 10/2004 | Jennings et al. | 370/390 |
| 6,826,165 B1* | 11/2004 | Meier et al. | 370/338 |
| 6,826,191 B1* | 11/2004 | Jones et al. | 370/401 |
| 6,842,453 B1* | 1/2005 | Kloth et al. | 370/392 |
| 6,876,654 B1* | 4/2005 | Hegde | 370/392 |
| 6,910,148 B1* | 6/2005 | Ho et al. | 714/4.4 |
| 6,944,654 B1* | 9/2005 | Murphy et al. | 709/223 |
| 6,980,537 B1* | 12/2005 | Liu | 370/338 |
| 6,990,103 B1* | 1/2006 | Gollamudi | 370/395.31 |
| 7,002,977 B1* | 2/2006 | Jogalekar | 370/410 |
| 7,007,101 B1* | 2/2006 | Schwaderer | 709/238 |
| 7,024,548 B1* | 4/2006 | O'Toole, Jr. | 713/1 |
| 7,051,078 B1* | 5/2006 | Cheriton | 709/214 |
| 7,058,054 B2* | 6/2006 | Abdollahi et al. | 370/392 |
| 7,062,565 B1* | 6/2006 | Ravindranath et al. | 709/229 |
| 7,068,661 B1* | 6/2006 | Watt et al. | 370/395.31 |
| 7,085,274 B1* | 8/2006 | Rahim et al. | 370/394 |
| 7,116,682 B1* | 10/2006 | Waclawsky et al. | 370/468 |
| 7,120,122 B1* | 10/2006 | Starr et al. | 370/250 |
| 7,143,235 B1* | 11/2006 | Watanabe et al. | 711/114 |
| 7,180,887 B1* | 2/2007 | Schwaderer | 370/351 |
| 7,193,968 B1* | 3/2007 | Kapoor et al. | 370/235 |
| 7,227,838 B1* | 6/2007 | O'Riordan | 370/219 |
| 7,251,215 B1* | 7/2007 | Turner et al. | 370/231 |
| 7,339,887 B2* | 3/2008 | Griswold et al. | 370/216 |
| 7,398,323 B1* | 7/2008 | Gerraty et al. | 709/242 |
| 7,426,206 B1* | 9/2008 | Ofek et al. | 370/389 |
| 7,492,713 B1* | 2/2009 | Turner et al. | 370/231 |
| 7,548,539 B2* | 6/2009 | Kouretas et al. | 370/356 |
| 7,577,149 B1* | 8/2009 | Rahim et al. | 370/394 |
| RE40,903 E | 9/2009 | Dolganow et al. | 709/242 |
| 7,640,325 B1* | 12/2009 | DeKoning et al. | 709/223 |
| 7,652,982 B1* | 1/2010 | Kovummal | 370/216 |
| 7,664,494 B2* | 2/2010 | Jiang | 455/432.1 |
| 7,668,082 B1* | 2/2010 | Callon | 370/218 |
| 7,693,048 B1* | 4/2010 | O'Riordan | 370/219 |
| 8,224,971 B1* | 7/2012 | Miller et al. | 709/227 |
| 8,699,484 B2* | 4/2014 | Ee et al. | 370/389 |
| 2001/0025310 A1* | 9/2001 | Krishnamurthy et al. | 709/223 |
| 2002/0099423 A1* | 7/2002 | Berg et al. | 607/60 |
| 2002/0116515 A1* | 8/2002 | Hashimoto | 709/230 |
| 2002/0145981 A1* | 10/2002 | Klinker et al. | 370/244 |
| 2002/0159463 A1* | 10/2002 | Wang | 370/401 |
| 2002/0184360 A1* | 12/2002 | Weber et al. | 709/223 |
| 2003/0002509 A1* | 1/2003 | Vandenhoudt et al. | 370/395.72 |
| 2003/0009584 A1* | 1/2003 | Basso et al. | 709/238 |
| 2003/0016688 A1* | 1/2003 | Hoof | 370/417 |
| 2003/0093463 A1* | 5/2003 | Graf | 709/203 |
| 2003/0236827 A1* | 12/2003 | Patel et al. | 709/203 |
| 2004/0001485 A1* | 1/2004 | Frick et al. | 370/392 |
| 2004/0029553 A1* | 2/2004 | Cain | 455/403 |
| 2004/0044778 A1* | 3/2004 | Alkhatib et al. | 709/228 |
| 2004/0085969 A1* | 5/2004 | Chen et al. | 370/397 |
| 2004/0100951 A1* | 5/2004 | O'neill | 370/389 |
| 2004/0122929 A1* | 6/2004 | Wadekar | 709/223 |
| 2004/0148382 A1* | 7/2004 | Narad et al. | 709/223 |
| 2004/0165592 A1* | 8/2004 | Chen et al. | 370/395.1 |
| 2004/0165604 A1* | 8/2004 | Oh et al. | 370/401 |
| 2004/0172104 A1* | 9/2004 | Berg et al. | 607/60 |
| 2004/0202125 A1* | 10/2004 | Sakamoto et al. | 370/331 |
| 2004/0205105 A1* | 10/2004 | Larsson et al. | 709/200 |
| 2004/0215819 A1* | 10/2004 | Tsuruoka et al. | 709/238 |
| 2005/0014468 A1* | 1/2005 | Salokannel et al. | 455/41.2 |
| 2005/0021752 A1* | 1/2005 | Marimuthu et al. | 709/225 |
| 2005/0037781 A1* | 2/2005 | Ozugur et al. | 455/458 |
| 2005/0089027 A1* | 4/2005 | Colton | 370/380 |
| 2005/0094636 A1* | 5/2005 | Lee et al. | 370/389 |
| 2005/0108397 A1* | 5/2005 | Basso et al. | 709/225 |
| 2005/0108416 A1* | 5/2005 | Khosravi et al. | 709/232 |
| 2005/0135363 A1* | 6/2005 | Horinouchi et al. | 370/389 |
| 2005/0136924 A1* | 6/2005 | Adrangi et al. | 455/435.1 |
| 2005/0177634 A1* | 8/2005 | Scudder et al. | 709/225 |
| 2005/0220079 A1* | 10/2005 | Asokan | 370/352 |
| 2005/0259654 A1* | 11/2005 | Faulk, Jr. | 370/392 |
| 2006/0029104 A1* | 2/2006 | Jungck | 370/498 |
| 2006/0045004 A1* | 3/2006 | Charzinski et al. | 370/216 |
| 2006/0109829 A1* | 5/2006 | O'Neill | 370/338 |
| 2006/0135173 A1* | 6/2006 | Vannithamby | 455/453 |
| 2006/0176828 A1* | 8/2006 | Vasseur et al. | 370/252 |
| 2006/0203832 A1* | 9/2006 | Endo et al. | 370/401 |
| 2006/0209822 A1* | 9/2006 | Hamamoto et al. | 370/389 |
| 2006/0291480 A1* | 12/2006 | Cho et al. | 370/397 |
| 2007/0047446 A1* | 3/2007 | Dalal et al. | 370/237 |
| 2007/0047540 A1* | 3/2007 | Bragg et al. | 370/386 |
| 2007/0047585 A1* | 3/2007 | Gillespie et al. | 370/475 |
| 2007/0091827 A1* | 4/2007 | Boers et al. | 370/255 |
| 2007/0118628 A1* | 5/2007 | Kumar et al. | 709/221 |
| 2007/0127459 A1* | 6/2007 | Lo et al. | 370/389 |
| 2007/0140128 A1* | 6/2007 | Klinker et al. | 370/238 |
| 2007/0177523 A1* | 8/2007 | Nagami et al. | 370/252 |
| 2007/0183416 A1* | 8/2007 | Gooch et al. | 370/389 |
| 2007/0195794 A1* | 8/2007 | Fujita et al. | 370/395.53 |
| 2007/0201461 A1* | 8/2007 | Shinohara et al. | 370/389 |
| 2007/0253328 A1* | 11/2007 | Harper et al. | 370/219 |
| 2007/0253371 A1* | 11/2007 | Harper et al. | 370/331 |
| 2007/0254661 A1* | 11/2007 | Chowdhury et al. | 455/436 |
| 2007/0268858 A1* | 11/2007 | Soto | 370/328 |
| 2007/0280686 A1* | 12/2007 | Amemiya et al. | 398/51 |
| 2007/0286217 A1* | 12/2007 | Miyata | 370/401 |
| 2008/0031257 A1* | 2/2008 | He | 370/395.31 |
| 2008/0049620 A1* | 2/2008 | Riga et al. | 370/236 |
| 2008/0137541 A1* | 6/2008 | Agarwal et al. | 370/241 |
| 2008/0137646 A1* | 6/2008 | Agarwal et al. | 370/352 |
| 2008/0137671 A1* | 6/2008 | Agarwal et al. | 370/401 |
| 2008/0139166 A1* | 6/2008 | Agarwal et al. | 455/404.1 |
| 2008/0175251 A1* | 7/2008 | Oouchi et al. | 370/395.31 |
| 2008/0176582 A1* | 7/2008 | Ghai et al. | 455/456.2 |
| 2008/0189769 A1* | 8/2008 | Casado et al. | 726/4 |
| 2008/0212610 A1* | 9/2008 | Ward et al. | 370/469 |
| 2008/0266384 A1* | 10/2008 | Triplicane et al. | 348/14.09 |
| 2008/0294926 A1* | 11/2008 | Eshraghian et al. | 713/400 |
| 2009/0086742 A1* | 4/2009 | Ghai et al. | 370/401 |
| 2009/0129271 A1* | 5/2009 | Ramankutty et al. | 370/235 |
| 2009/0138577 A1* | 5/2009 | Casado et al. | 709/220 |
| 2009/0141625 A1* | 6/2009 | Ghai et al. | 370/230 |
| 2009/0156213 A1* | 6/2009 | Spinelli et al. | 455/436 |
| 2009/0172785 A1* | 7/2009 | Chowdhury et al. | 726/4 |
| 2009/0285225 A1* | 11/2009 | Dahod | 370/401 |
| 2010/0027448 A1* | 2/2010 | Puthiyandyil et al. | 370/310 |
| 2010/0034081 A1* | 2/2010 | Yoshimura | 370/228 |
| 2010/0034115 A1* | 2/2010 | Busch | 370/252 |
| 2010/0039935 A1* | 2/2010 | Davison et al. | 370/228 |
| 2010/0039978 A1* | 2/2010 | Rangan | 370/312 |
| 2010/0039993 A1* | 2/2010 | Ramankutty et al. | 370/328 |
| 2010/0041373 A1* | 2/2010 | Ramankutty et al. | 455/411 |
| 2010/0046531 A1* | 2/2010 | Louati et al. | 370/401 |
| 2010/0046532 A1* | 2/2010 | Okita | 370/401 |
| 2010/0080222 A1* | 4/2010 | Mohapatra et al. | 370/392 |
| 2010/0085972 A1* | 4/2010 | Yan et al. | 370/392 |
| 2010/0085978 A1* | 4/2010 | Ramankutty et al. | 370/401 |
| 2010/0091653 A1* | 4/2010 | Koodli et al. | 370/235 |
| 2010/0098086 A1* | 4/2010 | Fromm et al. | 370/392 |
| 2010/0103845 A1* | 4/2010 | Ulupinar et al. | 370/254 |
| 2010/0124223 A1* | 5/2010 | Gibbs et al. | 370/389 |

(56) References Cited

U.S. PATENT DOCUMENTS

| | | | |
|---|---|---|---|
| 2010/0124933 A1* | 5/2010 | Chowdhury et al. | 455/453 |
| 2010/0161960 A1* | 6/2010 | Sadasivan | 713/152 |
| 2011/0228682 A1* | 9/2011 | Enomoto et al. | 370/244 |

OTHER PUBLICATIONS

Open Networking Foundationm OpenFlow Switch Specification Version 1.0.0 (Wire Protocol 0x01), Dec. 31, 2009.*

NEC, IP8800/S3640 Software Manual, OpenFlow Feature Guide (Version 11.1 Compatible), May 2010.*

Salsano, "EXOTIC final evaluation and overall report", May 11, 2013, OFELIA consortium, Version 1.0, pp. 1-46.*

McKeown, Nick et al., "OpenFlow: Enabling Innovation in Campus Network", Mar. 14, 2008, 6 pgs.

Das, Saurav et al., "Unifying Packet and Circuit Switched Networks", http://OpenFlowSwitch.org/downloads/technicalreports/openflow-tr-2009-4-unification.pdf, Dec. 7, 2009, 10 pgs.

Sherwood, Rob et al., "Flowvisor: A Network virtualization Layer", http://OpenFlowSwitch.org/downloads/technicalreports/openflow-tr-2009-l-flowvisor.pdf, Oct. 14, 2009, 15 pgs.

Heller, Brandon et al., "OpenFlow Switch Specification", Version 1.0.0 (Wire Protocol 0x0 1 ), Dec. 31, 2009, 42 pgs.

L. Yang et al., "RFC 3746—Forwarding and Control Element Separation (ForCES) Framework", http:www.faqs.ord/rfcs/rfc3746.html, printed from internet Apr. 21, 2011, 33 pgs.

A. Crouch et al., "Forwarding and Control Element Separation (ForCES) Applicability Statement", Internet Engineering Task Force (IETF), Oct. 2010, 14 pgs.

A. Doria et al.., "Forwarding and Control Element Separation (ForCES) Protocol Specification", Internet Engineering Task Force (IETF), Mar. 2010, 124 pgs.

J. Halpern et al., "Forwarding and Control Element Separation (ForCES) Forwarding Element Model", Internet Engineering Task Force (IETF), Mar. 2010, 134 pgs.

* cited by examiner

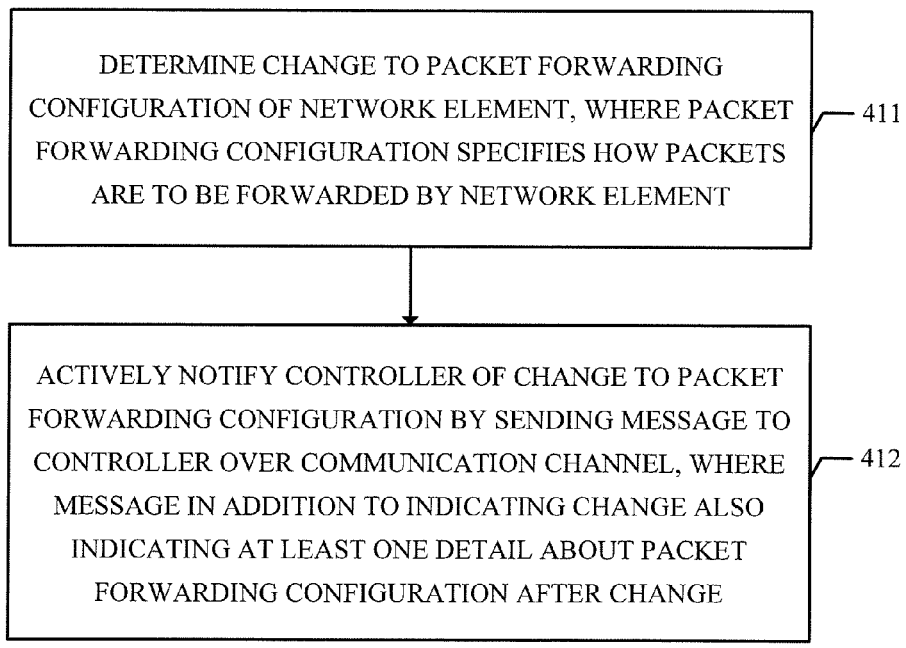

1365

```
 0                   1                   2                   3
 0 1 2 3 4 5 6 7 8 9 0 1 2 3 4 5 6 7 8 9 0 1 2 3 4 5 6 7 8 9 0 1
```

| VERSION 1330 | TYPE 1331 | LENGTH 1332 |
|---|---|---|
| XID 1333 ||| 
| RFG\|M\|F\|  1367 || MISS SEND LEN 1366 |

| R | O | E | M | F |   |   |   |   |   |   |   |   |   |   |   |

FIG. 14

NOTIFYING A CONTROLLER OF A CHANGE TO A PACKET FORWARDING CONFIGURATION OF A NETWORK ELEMENT OVER A COMMUNICATION CHANNEL

CROSS-REFERENCE TO RELATED APPLICATIONS

This application claims the benefit of U.S. Provisional Application No. 61/358,455, filed Jun. 25, 2010, entitled "OPENFLOW SWITCH CONFIGURATION CHANGE FEEDBACK MECHANISM," which is hereby incorporated by reference.

FIELD

Embodiments of the invention relate to the field of networking; and more specifically, to notifying a controller of a change to a configuration of a network element over a communication channel.

BACKGROUND

Conventional switches and routers typically have both a control plane and a data plane (sometimes referred to as a forwarding plane or a media plane) as part of the same device. For routers, the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGPs), etc.) that communicate with other network elements to exchange routes and select routes based on one or more routing metrics. Routes and adjacencies are stored in one or more routing structures (e.g., Routing Information Base (RIB), Label Information Base (LIB), or one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. For layer 2 forwarding, the network element can store one or more bridging tables that are used to forward data based on the layer 2 information in the data. The data plane uses the forwarding and adjacency structures when forwarding traffic.

Such conventional routers and switches typically provide little if any control over the data or traffic forwarding by network operators or other entities external to the router or switch. OpenFlow is a protocol that allows data or traffic forwarding decisions of an OpenFlow switch to be controlled by a separate, external OpenFlow controller. FIG. 1 is a block diagram of an example of an OpenFlow network 100 including an OpenFlow switch 101 and an OpenFlow controller 104 that communicate over a secure communication channel 103 using OpenFlow protocol messages. The OpenFlow switch has at least one flow table 102 that is used to perform packet lookup and forwarding. The flow table includes a set of forwarding rules that specify how packets of flows are to be forwarded by the OpenFlow switch.

FIG. 2 is a block diagram of an example of a flow table 202. The flow table includes a set of flow entries 205, namely flow entry #1 205-1, flow entry #2 205-2, and flow entry #N 205-N, where N is an integer number. FIG. 3 is a block diagram of an example of a flow entry 305. The flow entry has header fields 306 to compare or match against packets, counters 307 to update for matching packets, and zero or more actions 308 that the OpenFlow switch is to apply to matching packets. Headers of a packet received by an OpenFlow switch may be parsed and compared against the flow table. If the headers of the packet match the headers of a flow entry, then the actions for that flow entry may be performed on the packet. Examples of possible actions include forward the packet to one or more output ports, encapsulate the packet and forward it to the OpenFlow controller, and drop the packet. If no actions are listed, the packet may be dropped. If the packet does not match any of the flow entries (e.g., if the packet is the first packet in a new flow), the OpenFlow switch may encapsulate the packet and send the packet to the OpenFlow controller.

Referring again to FIG. 1, the OpenFlow controller 104 may modify the flow table 102 by sending flow table modification messages to the OpenFlow switch 101 over the secure communication channel 103 to control how the OpenFlow switch 101 forwards packets. Examples of flow table modification messages include a message to add a new flow entry (e.g., OFPFC_ADD), messages to modify matching flow entries (e.g., OFPFC_MODIFY or OFPFC_MODIFY_STRICT), and messages to delete matching flow entries (e.g., OFPFC_DELETE or OFPFC_DELETE_STRICT).

The OFPFC_ADD message is able to specify an idle timeout value indicating when the corresponding flow entry added by the message should be removed due to a lack of activity, and a hard timeout value that indicates when the corresponding flow entry should be removed regardless of activity. The OFPFC_ADD message is able to set an OFPFF_SEND_FLOW_REM flag to specify that the OpenFlow switch is to send a flow removed message to the OpenFlow controller when the corresponding flow entry expires. If the flow expires (e.g., if no packet has matched within the idle timeout period or the flow has existed for the hard timeout period), and the OFPFF_SEND_FLOW_REM flag is set, the OpenFlow switch is to remove the flow entry and send a flow removed message to the OpenFlow controller. Also, if the OpenFlow controller sends an OFPFC_DELETE message and a flow entry matches and is deleted, the OpenFlow switch is to send a flow removed message to the OpenFlow controller for each normal flow entry deleted by the message where the OFPFF_SEND_FLOW_REM flag is set.

The OpenFlow controller is also able to send read-state messages to request information or statistics about the OpenFlow switches flow table(s), ports, and individual flow entries. Examples include OFPST_FLOW to request information about individual flows, OFPST_AGGREGATE to request aggregate information about multiple flows, OFPST_TABLE to request information about tables, and OFPST_PORT to request information about physical ports. The OpenFlow switch is able to send reply messages to such request messages.

SUMMARY

A method performed by a network element, for notifying a controller of a change to a packet forwarding configuration of the network element. The network element is separated from the controller by a communication channel. The method includes a step of determining the change to the packet forwarding configuration of the network element. The packet forwarding configuration specifies how packets are to be forwarded by the network element. The method also includes a step of actively notifying the controller of the change to the packet forwarding configuration by sending a message to the controller over the communication channel. The message, in addition to indicating the change, also indicates at least one detail about the packet forwarding configuration after the change. A possible advantage is that such a method may allow the network element to determine the change to the packet forwarding configuration and notify the controller of the change so that the controller is able to maintain an accurate record of the packet forwarding configuration of the network element.

A network element that is operable to be coupled with a controller by a communication channel and that is operable to notify the controller of a change to a packet forwarding configuration of the network element. The network element includes an interface to the communication channel. The network element also includes the packet forwarding configuration. The packet forwarding configuration specifies how packets are to be forwarded by the network element. The network element also includes a configuration change determination module. The configuration change determination module is operable to determine the change to the packet forwarding configuration of the network element. A notification module of the network element is operable to notify the controller of the change to the packet forwarding configuration by sending a message to the controller over the communication channel through the interface. The message, in addition to indicating the change, also indicates at least one detail about the packet forwarding configuration after the change. A possible advantage is that the network element may determine the change to the packet forwarding configuration and notify the controller of the change so that the controller is able to maintain an accurate record of the packet forwarding configuration of the network element.

A method performed by a controller of a network element, for updating a record of a packet forwarding configuration of the network element that is maintained by the controller. The controller is separated from the network element by a communication channel. The method includes a step of receiving a notification of a change to the packet forwarding configuration of the network element over the communication channel. The packet forwarding configuration specifies how packets are to be forwarded by the network element. The notification, in addition to indicating the change, also indicates at least one detail about the packet forwarding configuration of the network element after the change. The method also includes a step of updating the record of the packet forwarding configuration to reflect the change. A possible advantage is that the network element is notified of the change and updates a record of the packet forwarding configuration of the network element so that it is accurate.

A controller of a network element that is operable to be coupled with the network element by a communication channel and that is operable to update a record of a packet forwarding configuration of the network element that is maintained by the controller. The controller includes an interface to the communication channel. The interface is operable to receive a notification of a change to the packet forwarding configuration of the network element from the communication channel. The notification, in addition to indicating the change, also indicates at least one detail about the packet forwarding configuration of the network element after the change. The controller also includes the record of the packet forwarding configuration of the network element. The packet forwarding configuration specifies how packets are to be forwarded by the network element. The controller further includes an update module to update the record of the packet forwarding configuration to reflect the change indicated by the notification. A possible advantage is that the network element is operable to be notified of the change and operable to update a record of the packet forwarding configuration of the network element so that it is accurate.

BRIEF DESCRIPTION OF THE DRAWINGS

The invention may best be understood by referring to the following description and accompanying drawings that are used to illustrate embodiments of the invention. In the drawings:

FIG. 3 is a block diagram of an example of a flow entry.

FIG. 4 is a block flow diagram of an embodiment of a method that may be performed by a network element to notifying a controller, which is separated from the network element by a communication channel, of a change to a packet forwarding configuration of the network element.

FIG. 13 is a block diagram illustrating an example embodiment of a message which has flags to configure modification and notification behavior in the network element with a scope of multiple messages.

FIG. 14 is a block diagram illustrating an example embodiment of a message which has flags to configure modification and notification behavior in the network element with a scope of a single message.

DESCRIPTION OF EMBODIMENTS

Figure 1:
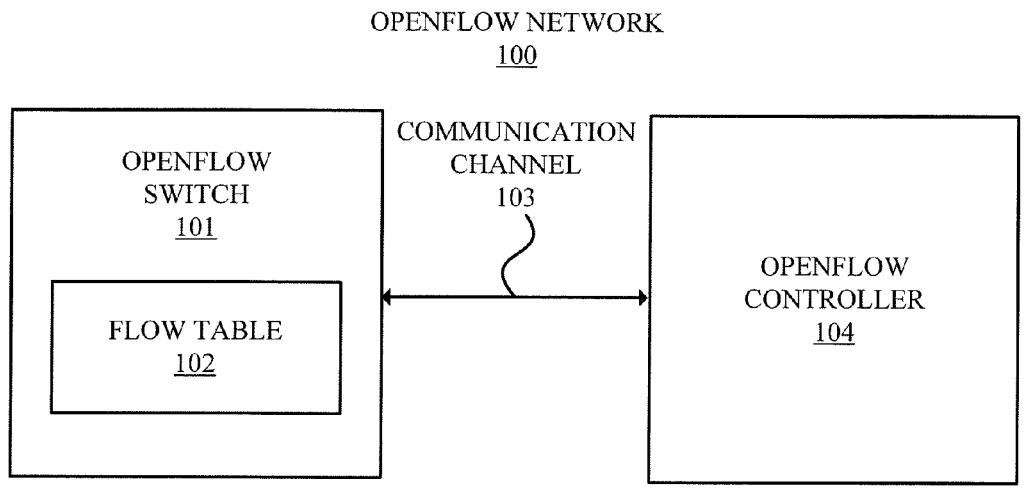
FIG. 1 is a block diagram of an example of an OpenFlow network including an OpenFlow switch and an OpenFlow controller that communicate over a secure communication channel using OpenFlow protocol messages.
Figure 2:
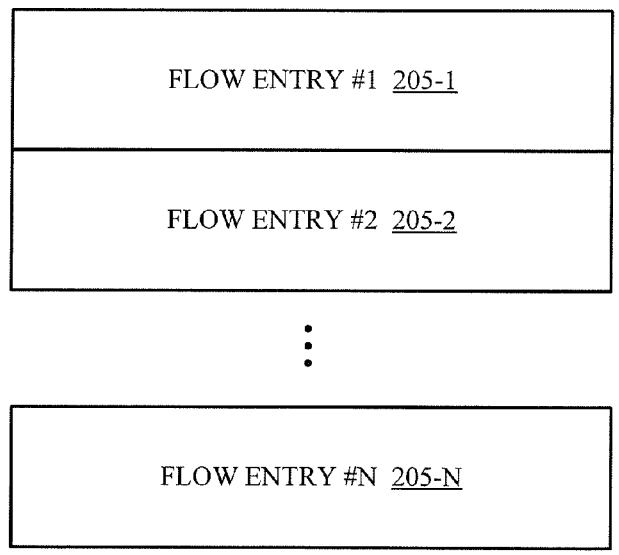
FIG. 2 is a block diagram of an example of a flow table.

The following description describes methods and apparatus for notifying a controller of a change to a packet forwarding configuration of a network element by sending a message to the controller over a communication channel. In the following description, numerous specific details, such as specific protocols, specific types of packet forwarding configurations, specific content and formats for messages and data structures, and specific logic partitioning/integration choices are set forth in order to provide a more thorough understanding of the present invention. It will be appreciated, however, by one skilled in the art that other embodiments of the invention may be practiced without such specific details. In other instances, details have not been shown in detail in order not to obscure the invention. Those of ordinary skill in the art, with the included descriptions, will be able to implement appropriate functionality without undue experimentation.

One limitation to the current OpenFlow protocol is that it describes an extremely limited set of circumstances under which the OpenFlow switch is able to notify the OpenFlow controller of changes to the flow table. This is especially true when the change to the flow table is a revision, alteration, update or other change to a flow entry, rather than merely a deletion of the flow entry. The aforementioned flow removed messages are only sent when flow entries are removed or deleted (e.g., due to timeout or due to an OFPFC_DELETE message) when appropriate flags are set. Moreover, the aforementioned reply messages sent by the OpenFlow switch to reply to read-state messages to request information or statistics about the OpenFlow switch are only sent to reply to such messages sent from the OpenFlow controller. Moreover, such read-state messages may also be delayed relative to the actual changes to the flow table. If many such read-state messages are sent frequently, in an effort to reduce such delays, this may tend to consume significant computational and network resources.

As a result, certain changes to the flow table may not be communicated to the OpenFlow controller in a prompt and effective manner. This may cause the OpenFlow controller to have inaccurate or outdated information about the content of the flow table, which may potentially cause the OpenFlow controller to implement unintended, undesirable, inefficient, or invalid packet forwarding operations. For example, the OpenFlow controller could configure an inefficient hop or even a loop in the network. Accordingly, additional methods and apparatus for a network element to notify a controller of a change to a flow table or other packet forwarding configuration of the network element by sending a message to the controller over a communication channel may offer certain advantages.

FIG. 4 is a block flow diagram of an embodiment of a method 410 that may be performed by a network element to notifying a controller, which is separated from the network element by a communication channel, of a change to a packet forwarding configuration of the network element. In one embodiment, the method may be performed by an OpenFlow enabled network element (e.g., a router, switch, or bridge), although the scope of the invention is not so limited. As used herein, the term OpenFlow is intended to encompass future versions, future releases, improvements, and extensions to OpenFlow. Moreover, other embodiments are applicable to other protocols besides those that are extensions or derivations of OpenFlow, where a network element notifies a separate controller of configuration changes.

Referring again to FIG. 4, the change to the packet forwarding configuration of the network element is determined, at block 411. The packet forwarding configuration specifies how packets are to be forwarded by the network element. In one embodiment, the packet forwarding configuration may include a flow table. The flow table or other packet forwarding configuration may represent a set of packet forwarding rules that determines how packets for flows are to be forwarded.

In one aspect, the flows may represent sets of packets with consistent header fields. The flows may be at the data link level (e.g., Ethernet switching based on media access control (MAC) address), network level (e.g., Internet protocol (IP) based routing), or transport level (e.g., based on transmission control protocol (TCP) address). By way of example, a flow may be a TCP connection, all packets from a particular MAC address, all packets from a particular IP address, all packets with the same virtual local area network (VLAN) tag, or all packets from the same switch port, etc.

In one embodiment, the change may be determined by the network element based at least in part on information internal or privy to the network element and/or based on information that is not known or not readily available to the controller. In one aspect, the change may be one that the controller could not readily or easily otherwise learn about, if the network element did not notify the controller of the change. In one embodiment, the change to the packet forwarding configuration is not merely a deletion of a flow entry, or other portion of the packet forwarding configuration, but rather may be a revision, alteration, modification, or update of the flow entry or other portion of the packet forwarding configuration, from an initial state to a changed state.

Referring again to FIG. 4, the network element actively or proactively (e.g., not merely as a response to a query or request for information previously sent from the controller) notifies the controller of the change to the packet forwarding configuration by sending a message to the controller over the communication channel, at block 412. In one embodiment, the message in addition to indicating the change (e.g., flow entry deleted, flow entry added, flow entry modified) also indicates at least one detail about the packet forwarding configuration after the change. For example, a portion of the packet forwarding configuration (e.g., one or more entries or fields of the packet forwarding configuration) may have a first, initial state prior to the change, and a second, changed state after the change, and the at least one detail may be a detail about the portion of the packet forwarding configuration in the second, changed state. A few examples of possible details include, but are not limited to, a changed header field or matching structure that packets are to be compared or matched against, a changed packet forwarding action that is to be applied to matching packets, a changed output port to be used for forwarding, a changed virtual port, etc. In one aspect, the at least one detail may help to specify not only what change occurred (e.g., flow entry deleted, flow entry added, or flow entry modified) but also what the packet forwarding configuration changed to (e.g., an attribute of the changed configuration).

Advantageously, such a method may allow the network element to be able to determine the change to the packet forwarding configuration (e.g. is not limited to only those changes indicated by the controller), and notify the controller of the change so that the controller is able to accurately know, or maintain an accurate record of, the packet forwarding configuration of the network element.

Figure 5:
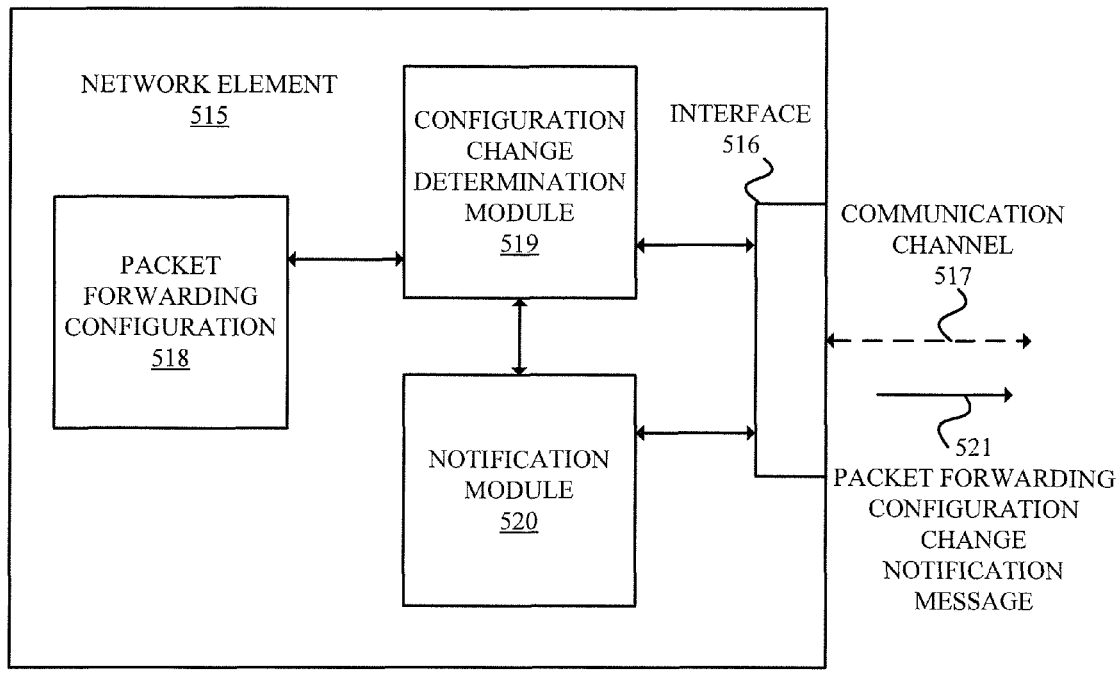
FIG. 5 is a block diagram of an example embodiment of a network element that is operable to notify a controller of a change to a packet forwarding configuration of the network element.

FIG. 5 is a block diagram of an example embodiment of a network element 515 that is operable to notify a controller of a change to a packet forwarding configuration 518 of the network element. The network element is operable to be coupled with the controller by a communication channel 517.

In various embodiments, the network element 515 may be a switch, router, bridge, Wi-Fi access point, or other network element. The network element 515 may be included at various locations in a network. For example, the network element 515 may be a core network element, an edge network element, a network element within a mobile backhaul, etc.

As used herein, a network element (e.g., a router, switch, or bridge, etc.) is a piece of networking equipment, including hardware and software, which communicatively interconnects other equipment on the network (e.g., other network elements or end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, laptops, mobile phones, smartphones, user equipment, terminals, set-top boxes, etc.) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

In one embodiment, the network element may be an OpenFlow enabled network element (e.g., an OpenFlow switch), although the scope of the invention is not so limited. One example of a suitable OpenFlow switch implementation that may be adapted is Open vSwitch, which is open source and currently available online. Other examples of suitable OpenFlow switch implementations that may be adapted are Linux Software Reference System and NetFPGA Reference System, which is currently available online.

Referring again to FIG. 5, the network element includes an interface 516 to the communication channel 517. The network element is operable to be coupled with the controller through the interface via the communication channel. In one aspect, the communication channel may be a secure communication channel.

The network element also includes the packet forwarding configuration 518. The packet forwarding configuration specifies how packets are to be forwarded by the network element. In one embodiment, the packet forwarding configuration includes a set of flow-based rules for forwarding packets for flows. For example, in one embodiment, the packet forwarding configuration includes one or more flow tables, each flow table having flow entries, each flow entry having header fields to compare or match against packets, counters to update for matching packets, and zero or more actions to apply to matching packets. Examples of actions include forward the packet to one or more output ports, encapsulate the packet and forward it to the controller, and drop the packet.

The network element also includes a configuration change determination module 519. The configuration change determination module is operable to determine the change to the packet forwarding configuration of the network element. The configuration change determination module may be implemented in hardware, firmware, software, or a combination thereof. In one embodiment, the configuration change determination module may be incorporated into an OpenFlow agent of the network element, although the scope of the invention is not so limited.

The network element also includes a notification module 520. The notification module is operable to notify the controller of the change to the packet forwarding configuration by sending a packet forwarding configuration change notification message 521 to the controller over the communication channel through the interface. In one embodiment, the message in addition to indicating the change also indicates at least one detail about the packet forwarding configuration after the change. The notification module may be implemented in hardware, firmware, software, or a combination thereof. In one embodiment, the notification module may be incorporated into an OpenFlow agent of the network element, although the scope of the invention is not so limited.

Advantageously, the network element may be able to determine the change to the packet forwarding configuration (e.g. the network element is not limited to only those changes indicated by the controller), and the network element may be able to notify the controller of the change so that the controller is able to accurately know, or maintain an accurate record of, the packet forwarding configuration of the network element.

In one embodiment, the network element of FIG. 5 may perform one or more operations or the method of FIG. 4. However, it should be understood that the operations or method of FIG. 4 can be performed by embodiments of network elements other than those of FIG. 5. Moreover, the network element of FIG. 5 can perform operations and methods entirely different from those of FIG. 4.

Figure 6:
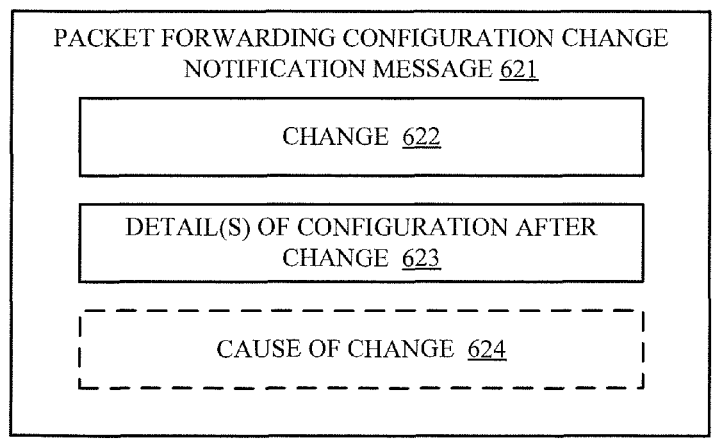
FIG. 6 is a block diagram of an example embodiment of a packet forwarding configuration change notification message.

FIG. 6 is a block diagram of an example embodiment of a packet forwarding configuration change notification message 621. The packet forwarding configuration change notification message may be sent from a network element to a controller to notify the controller of a change to a packet forwarding configuration of the network element.

The illustrated packet forwarding configuration change notification message includes a first field or portion 622 operable to indicate the change. For example, the first field or portion may indicate that a flow entry (or other configuration element) has been deleted, a flow entry has been added, or a flow entry has been modified.

The illustrated packet forwarding configuration change notification message also includes a second field or other portion 623 operable to indicate at least one detail of the packet forwarding configuration after the change. For example, the second field or portion may indicate a changed matching structure, a replacement port to replace an unavailable port, or a component or attribute of a flow entry or other portion of a packet forwarding configuration. In some cases, the second field or portion may be omitted, such as when deleting a flow entry, or positively acknowledging successful implementation of a change specified by a command from the controller.

In one embodiment, the packet forwarding configuration change notification message may optionally include a third field or portion 624 operable to indicate a cause of the change. For example, the third field or portion may indicate that a matching structure was invalid, a matching structure was optimized, a recovery has been performed to replace a port that is unavailable, a virtualization entity has translated a command from the controller, a management entity other than the controller has changed the configuration, etc. Consider briefly the reply an OpenFlow switch may sent to an OpenFlow controller in response to a read-state message or query as discussed above in the background section. One limitation with such a reply is that if the reply does not indicate the original configuration message sent by the controller (or provide the modification specified therein), then the OpenFlow controller may not be informed whether the configuration message was not implemented, or whether the configuration message was revised. The reply to the read-state message or query from the controller may not indicate the cause for the deviation from the intended modification. Advantageously, the notifications disclosed herein may indicate the cause of the deviation and may, depending on the change, indicate the configuration message sent by the controller.

Figure 7:
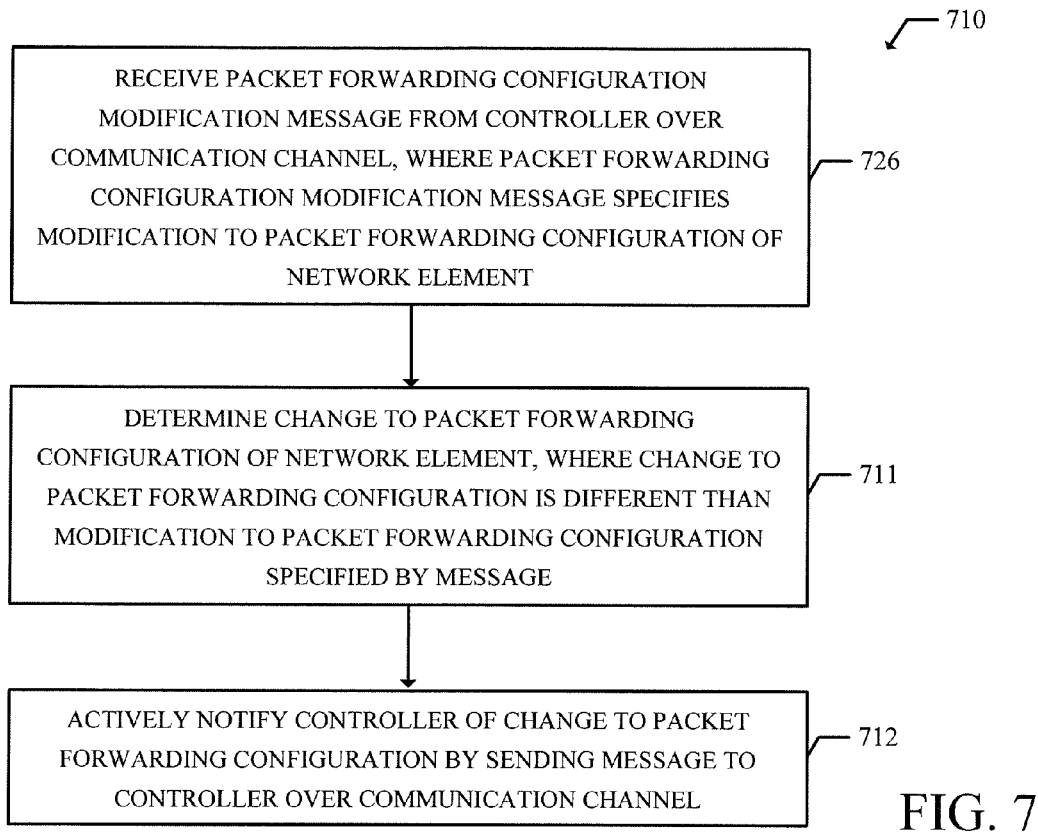
FIG. 7 is a block flow diagram of an embodiment of a method that may be performed by a network element to notify a controller of a change to a packet forwarding configuration of the network element, which is different than a modification to the packet forwarding configuration specified by a packet forwarding configuration modification message received from the controller.

FIG. 7 is a block flow diagram of an embodiment of a method 710 that may be performed by a network element to notify a controller of a change to a packet forwarding configuration of the network element, which is different than a modification to the packet forwarding configuration specified by a packet forwarding configuration modification message received from the controller.

The packet forwarding configuration modification message may be received from the controller over a communication channel, at block 726. In one embodiment, the packet forwarding configuration modification message is a flow table modification message (e.g., an OFP_FLOW_MOD_COMMAND). The flow table modification message or other packet forwarding configuration modification message specifies a modification to the packet forwarding configuration of the network element.

The change to the packet forwarding configuration of the network element, is determined, at block 711. In one embodiment, the network element determines the change. In another embodiment, a virtualization module or entity determines the change. The network element or the virtualization entity determines to revise, alter, update, or otherwise change the modification to the packet forwarding configuration as specified by the message received from the controller. Significantly, the determined change to the packet forwarding configuration of the network element is different than the modification to the packet forwarding configuration as specified by the message received from the controller. In other words, the intended modification specified in the message received from the controller is not implemented, but rather a different change is actually implemented on the packet forwarding configuration.

There are various different ways in which the network element may determine to revise, alter, adapt, update, or otherwise change the modification as specified by the message received from the controller. In one embodiment, the network element may determine that the received message has an invalid packet matching structure. The invalid packet matching structure may include, for example, two or more fields that are in contradiction such that packets ordinarily would not match, or should not match, with the invalid matching structure. As one illustrative example, the invalid packet matching structure may specify IP protocol=1 to designate Internet Control Message Protocol (ICMP), and may specify TCP/UDP src port=1. However, TCP ports are not used for ICMP packets. Accordingly, packets ordinarily would not match, or should not match, to such an invalid matching structure. Problems can occur if such an invalid matching structure is configured in the network element. For example, in some cases no packets will match, or in other cases the network element may ignore the TCP/UDP src port and allow ICMP packets to match. In the latter case the network element may essentially be changing the packet forwarding configuration without the controller being aware of the change. As an alternative, in one embodiment, the network element may detect the invalid packet matching structure and determine to change the invalid packet matching structure so that it is valid.

In another embodiment, the network element may determine that the received message has a non-optimal packet matching structure and/or a packet matching structure that can be changed to improve packet matching performance. In one embodiment, the network element may change the packet matching structure (e.g., change one or more header fields) in order to improve the response time of the matching procedure or otherwise improve performance. In one embodiment, such a change may be determined based at least in part on local knowledge of the internal performance and/or functioning of the network element, or information privy to the network element, which may not be available or readily available to the controller.

In yet another embodiment, a virtualization module or entity, either deployed on the network element itself, or otherwise logically disposed between the packet forwarding configuration and the controller, may determine to revise or otherwise change the modification specified by the packet forwarding configuration modification message. Such a virtualization module or entity represents an example embodiment of a configuration change determination module. One example of such a virtualization module or entity is a FlowVisor module or entity. According to the OpenFlow protocol, an OpenFlow switch should connect to only one controller. A FlowVisor module or entity may allow more than one controller to configure the OpenFlow switch. The FlowVisor module or entity may be deployed or logically disposed between the network element and one or more controllers, may allow the one or more controllers to communicate with the network element, and may emulate or present virtual switches or other network elements to the one or more controllers. Such a virtualization module or entity may receive the packet forwarding configuration modification message, and translate or otherwise change the modification to the packet forwarding configuration specified by the received message.

In a further embodiment, the network element may merge an existing flow entry with a new flow entry added specified to be added by a message from the controller. The network element may then report the change about the merging to the controller.

Referring again to FIG. 7, the network element actively notifies the controller of the change to the packet forwarding configuration (which is different than the modification to the packet forwarding configuration specified by the message received from the controller) by sending a packet forwarding configuration change notification message to the controller over the communication channel, at block 712. In one embodiment, the packet forwarding configuration change notification message, in addition to indicating the change, also indicates at least one detail about the packet forwarding configuration after the change.

Figure 8:
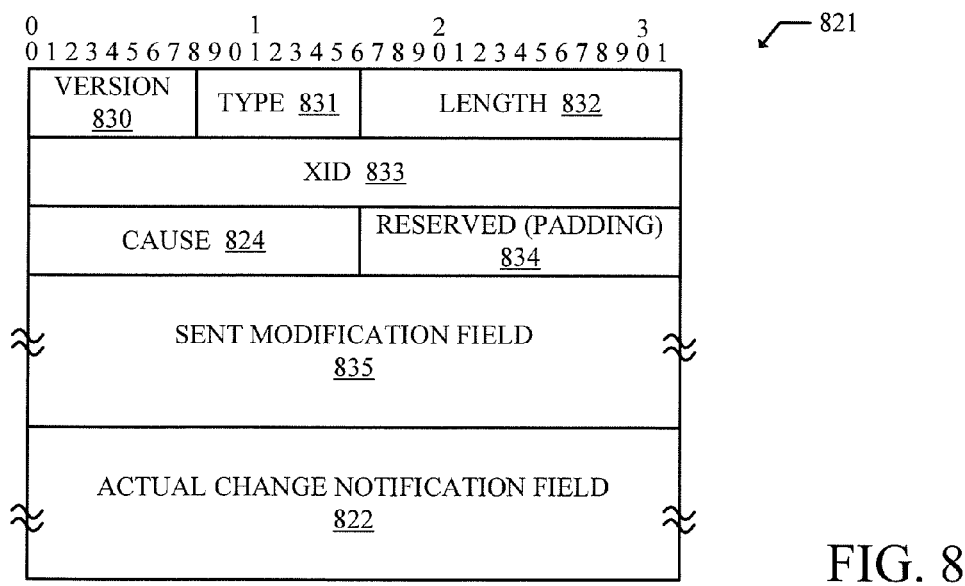
FIG. 8 is a block diagram illustrating a first example embodiment of a packet forwarding configuration change notification message having a sent modification field and an actual change notification field.

FIG. 8 is a block diagram illustrating a first example embodiment of a packet forwarding configuration change notification message 821 having a sent modification field 835 and an actual change notification field 822. The network element or a virtualization entity (e.g., a FlowVisor) may generate and send such a message to the controller.

The packet forwarding configuration change notification message includes a message header including a version field 830 to specify a version of the message, a type field 831 to specify a type of the message, a length field 832 to specify a length of the message, and an identifier field (xid) 833 to specify an identifier for the message. The message also has a reserved or padding field 834. The version, type, length, and identifier fields may be employed conventionally according to the OpenFlow protocol. Numbers at the top of the message represent bit positions, numbered from bit-0 through bit-31 defining the extents of the various fields, and are specific to the OpenFlow protocol. Other fields and other numbers of bits are appropriate for other protocols. In one embodiment, the type field 831 may be used to specify that the message is for feedback or notification. For example, the type field may have a value or constant assigned to OFP_FEEDBACK to indicate that the message is an OFP_FEEDBACK type of message. This particular value or constant is according to convention only and otherwise has no significance.

The packet forwarding configuration change notification message has a cause field 824 to specify a cause or reason for the feedback or notification. A few examples of possible causes include, but are not limited to: (a) the packet forwarding configuration modification message or a matching structure thereof was invalid (e.g., INVALID); (b) the packet forwarding configuration modification message or a matching structure thereof was changed to improve or optimize performance (e.g., OPTIMIZATION); and (c) the packet forwarding configuration modification message was translated by a virtualization entity (e.g., TRANSLATED). In one aspect, each of these example causes may be encoded as a different integer number or constant. In another aspect, the cause may be encoded as bit flags. Encoding the cause as bit flags may allow multiple causes to be encoded in a single configuration change notification message, but is not required.

The packet forwarding configuration change notification message also has a sent modification field 835. The sent modification field is operable to provide an indication of, or a modification specified by, a packet forwarding configuration modification message that was sent by a controller and/or received by the network element. In one aspect, the sent modification field indicates a packet forwarding configuration modification message (e.g., a flow table modification message) previously sent by the controller and/or received by the network element by specifying an identifier field (xid) 833 of the previously sent and/or received message, or a header including the identifier field (xid) 833 of the previously sent and/or received message. In another aspect, the sent modification field describes a modification specified in a packet forwarding configuration modification message previously sent by the controller and/or received by the network element. For example, the sent modification field may include a substantial copy of the previously sent and/or received message, which may in one aspect be a full OpenFlow flow table modification message, except optionally having a fake or artificial identifier field (xid).

The packet forwarding configuration change notification message also has an actual change notification field 822. The actual change notification field is operable to notify the controller of an actual change made to a packet forwarding configuration of the network element which is different than the modification specified in the received message. In one embodiment, the actual change notification field may include one or more details to describe the revision, alteration, updating, or changing of the packet forwarding configuration as it differs from what was intended by the packet forwarding configuration modification message that was sent by the controller and/or received by the network element as reflected in the sent modification field 835. Such details may be omitted if they are not needed. In one aspect, the actual change notification field may include a full OpenFlow message that the controller would sent to implement the actual change to the packet forwarding configuration. In another aspect, the actual change notification field may only specify changes relative to the content of the sent modification field 835. Advantageously, including both the sent modification field 835 and the actual change notification field 822 may help to communicate both the intended modification and the actual change to better assist the controller in maintaining an accurate record of the packet forwarding configuration of the network element despite such changes.

In one embodiment, the message 821 may also optionally be used as a positive acknowledgement message to notify the controller that a modification specified by a packet forwarding configuration modification message previously sent by the controller was implemented successfully. In such an embodiment, the cause field may indicate that the change specified by the previously sent packet forwarding configuration modification message was implemented successfully (e.g., "SUCCESS"). As before, the sent modification field 835 may provide an indication of, or a modification specified by, the previously sent packet forwarding configuration modification message. In various embodiments, either the whole packet forwarding configuration modification message sent by the controller may be included in the sent modification field, or a header having the XID of the sent message may be included in the sent notification field, or the XID for the sent message may be included in the sent notification field, or the modification specified by the sent message may be included in the sent notification field. In various embodiments, the actual change notification field 822 may be omitted, set to a null or ignored value, simply disregarded by the controller for this change field, etc.). The message 821, when employed as a positive acknowledgement message, is command agnostic. In other words, the message 821 may be used for diverse types of packet forwarding configuration change messages, not just merely messages that cause deletion of flow entries. For example, the message 821 may be used to positively acknowledge messages to add a flow entry, change a flow entry from a first state to a second state which is not merely a deletion, as well messages to delete a flow entry. Moreover, in one aspect the message 821 may be expected by the controller as a positive acknowledgement, if such a positive acknowledgement mechanism is optionally configured.

It is to be appreciated that certain of the fields shown in FIG. 8 may optionally be omitted if they are not needed or appropriate. For example, the actual change notification field 822 may optionally be omitted or set to a null or ignored value if the packet forwarding configuration modification message received from the controller was simply discarded (e.g., it was not revised but merely deleted). As another example, the actual change notification field 822 may optionally be omitted or set to a null or ignored value if the message is a positive acknowledgement. As yet another example, when the network element autonomously makes a change to the packet forwarding configuration, or a management entity other than the controller makes a change to the packet forwarding configuration, without a corresponding packet forwarding configuration modification message having been sent by the controller, then the sent modification field 835 may optionally be omitted or set to a null or ignored value.

Figure 9:
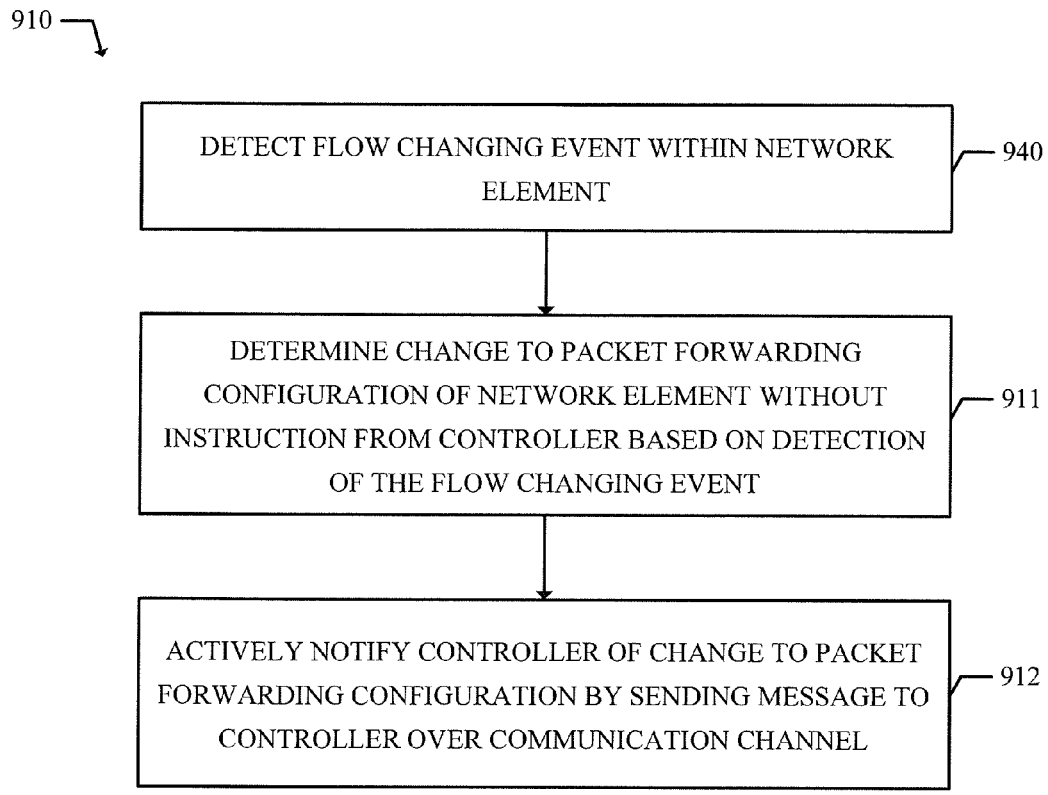
FIG. 9 is a block flow diagram of an embodiment of a method that may be performed by a network element to notify a controller of a change to a packet forwarding configuration of the network element, which is determined based on the detection of a flow changing event within the network element.

FIG. 9 is a block flow diagram of an embodiment of a method 910 that may be performed by a network element to notify a controller of a change to a packet forwarding configuration of the network element, which is determined based on the detection of a flow changing event within the network element.

The flow changing event is detected within the network element, at block 940. In one embodiment, the detection of the flow changing event may be a detection that one or more ports (e.g., a line card) associated with a flow have failed, have been taken offline, or are otherwise unavailable. This may be part of a recovery mechanism performed by the network element. As another example of a flow changing event, in one or more embodiments, a management or control entity other than the controller (e.g., a management entity within the network element) may change the configuration. As another example of when a network element may change its configuration not responsive to a configuration message from the controller, in an embodiment, the network element may permanently or temporary change (e.g., disable) a flow entry, for example, to optimize its flow entry set.

The change to the packet forwarding configuration (e.g., one or more flow entries) of the network element is determined based at least in part on the detection of the flow changing event, at block 911. In one embodiment, the network element or the virtualization entity may determine the change autonomously without explicit instruction from the controller. In other words, the network element or the virtualization entity may autonomously determine to update the packet forwarding configuration or make the change instead of the change being made responsive to or triggered by a corresponding configuration modifying message from the controller.

In one embodiment, the network element or a virtualization entity may determine one or more replacement ports (e.g., one or more backup ports) to replace the one or more unavailable ports. The network element may determine to make the change when it detects the ports being unavailable and/or detects network performance deterioration. The unavailability of a port represents an example of information that is internal or privy to the network element that may not be readily and/or timely available to the controller. As another option, the network element may change a matching structure.

The controller is actively notified of the change to the packet forwarding configuration by the network element sending a message to the controller over the communication channel, at block 912. In one embodiment, the message may, in addition to indicating the change, also indicate at least one detail about the packet forwarding configuration after the change. For example, in one embodiment, the message may indicate that a port for a flow has changed and indicate the replacement port for the flow.

Advantageously, such a method may allow the network element to be able to determine the change to the packet forwarding configuration based on the detection of the flow changing event, and notify the controller of the change so that the controller is able to accurately know or maintain an accurate record of the packet forwarding configuration of the network element.

Figure 10:
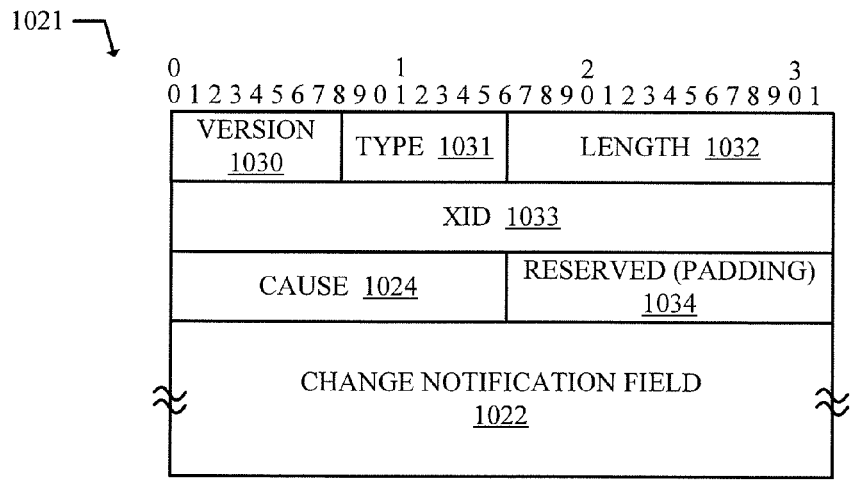
FIG. 10 is a block diagram illustrating a second example embodiment of a packet forwarding configuration change notification message having a change notification field.

FIG. 10 is a block diagram illustrating a second example embodiment of a packet forwarding configuration change notification message 1021 having a change notification field 1022. The network element or a virtualization entity (e.g., a FlowVisor) may generate and send such a message to the controller.

The packet forwarding configuration change notification message includes a message header including a version field 1030 to specify a version of the message, a type field 1031 to specify a type of the message, a length field 1032 to specify a length of the message, and an identifier field (xid) 1033 to specify an identifier for the message. The message also has a reserved or padding field 1034. The version, type, length, identifier, and reserved/padding fields may be substantially as described in the OpenFlow protocol and/or have other characteristics mentioned above for the corresponding named fields of the message of FIG. 8.

The packet forwarding configuration change notification message has a cause field 1024 to specify a cause or reason for the feedback or notification. One example of a possible cause is that one or more ports have failed or otherwise become unavailable and the change is to recover from the port(s) being unavailable (e.g., "RECOVERY"). Another example of a possible cause is that a management entity other than the controller has sent a packet forwarding configuration change message to the network element (e.g., "OTHER ENTITY"). In one aspect, such causes may each be encoded as a unique number or constant. In another aspect, the causes may be encoded as one or more bit flags. Encoding the causes as one or more bit flags may allow multiple causes to be encoded in a single configuration change notification message, but is not required.

The packet forwarding configuration change notification message also has a change notification field 1022. The change notification field is operable to notify the controller of a change made to a packet forwarding configuration of the network element. In one embodiment, the change notification field may include one or more details to describe the revision, alteration, updating, or changing of the packet forwarding configuration. Alternatively, in the case of a deletion of a flow entry, for example, such details are not required. In one aspect, the change notification field may include a full OpenFlow message or other message that the controller would generate and send to implement or achieve the change to the packet forwarding configuration.

Note that the message 1021 differs from the message 821 of FIG. 8 in that the message 1021 omits the sent modification field 835. The message 1021 may be sent, for example, when there is no corresponding configuration command previously sent by the controller that the change is relative to and/or when the change can be adequately conveyed to the controller through the single change notification field 1022.

The illustrated example embodiments of the packet forwarding configuration change notification messages 821 in FIG. 8 and 1021 in FIG. 10 is only illustrative examples, and is not required. These messages are suited for the OpenFlow protocol, and have various OpenFlow protocol specific fields (e.g., the version fields, the type fields, the length fields, the XID fields, and the reserved fields). Such fields may not be required for other protocols and may depending on the protocol be omitted, replaced, renamed, or combined into other fields. Moreover, alternate embodiments, in either the OpenFlow protocol or other protocols, as long as the particular protocol supports such modifications, may vary the number of fields (e.g., add fields or omit fields), vary the arrangement of the fields (e.g., move the fields around), vary the sizes of the fields (e.g., use more or less bits for the fields), provide additional content, provide less content, group certain fields together, separate the content into two or more different messages, etc.

Figure 11:
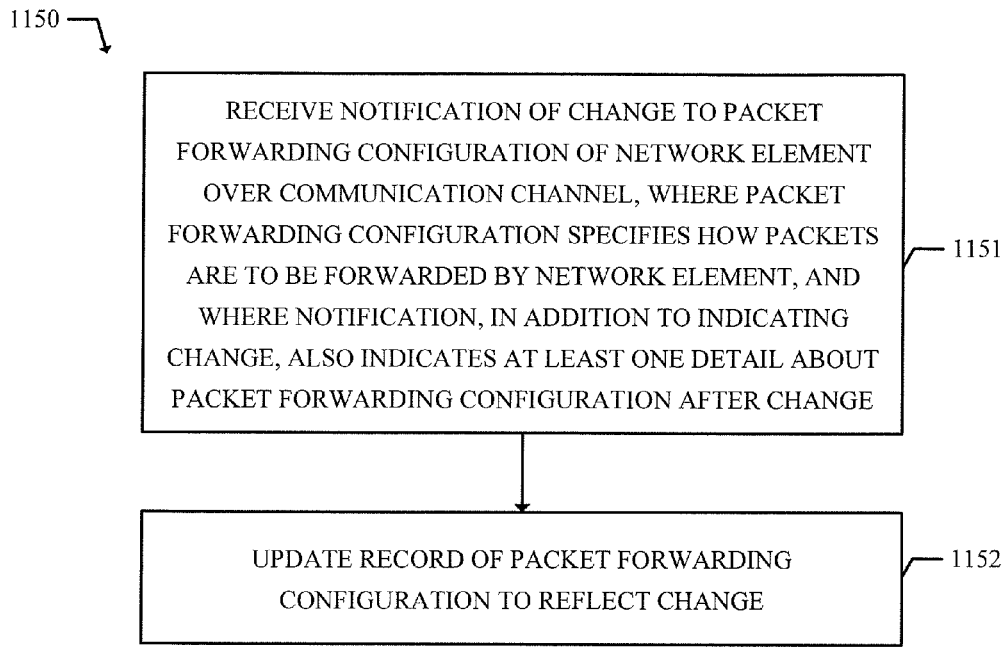
FIG. 11 is a block flow diagram of an example embodiment of a method that may be performed by a controller of a network element, for updating a record of a packet forwarding configuration of the network element that is maintained by the controller.

FIG. 11 is a block flow diagram of an example embodiment of a method 1150 that may be performed by a controller of a network element, for updating a record of a packet forwarding configuration of the network element that is maintained by the controller. The controller is separated from the network element by a communication channel. In one embodiment, the method may be performed by an OpenFlow controller, although the scope of the invention is not so limited.

The method includes receiving a notification of a change to the packet forwarding configuration of the network element over the communication channel, at block 1151. In one embodiment, the notification, in addition to indicating the change, also indicates at least one detail about the packet forwarding configuration of the network element after the change.

The method also includes updating the record of the packet forwarding configuration to reflect the change, at block 1152. In one embodiment, one or more details about the changed packet forwarding configuration may be recorded in the record.

Figure 12:
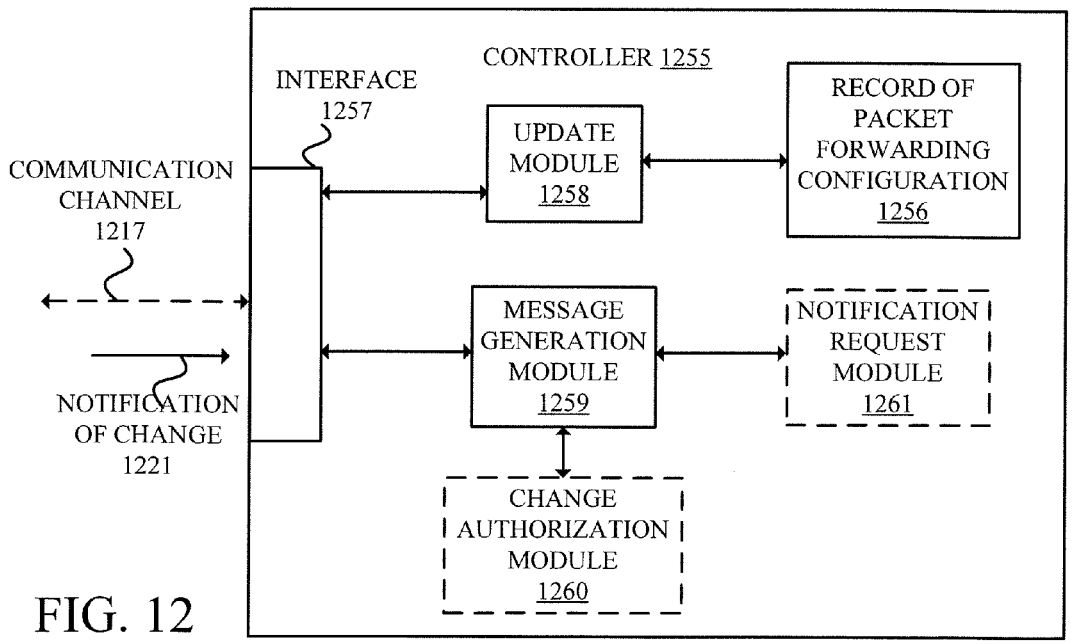
FIG. 12 is a block diagram of an example embodiment of a controller of a network element that is operable to update a record of a packet forwarding configuration of the network element that is maintained by the controller.

FIG. 12 is a block diagram of an example embodiment of a controller 1255 of a network element that is operable to update a record 1256 of a packet forwarding configuration of the network element that is maintained by the controller. The controller is operable to be coupled with the network element by a communication channel 1217. The controller may be implemented with a computer system or server. In one embodiment, the controller is an OpenFlow controller, although the invention is not so limited. An example of a suitable OpenFlow controller which may be used or adapted is NOX, which is open source and currently available online.

In one embodiment, the controller of FIG. 12 may perform one or more operations or the method of FIG. 11. However, it should be understood that the operations or method of FIG. 11 can be performed by embodiments of controllers other than those of FIG. 12. Moreover, the controller of FIG. 12 can perform operations and methods entirely different from those of FIG. 11.

The controller has an interface 1257 to the communication channel. The interface is operable to receive a notification of a change 1221 to the packet forwarding configuration of the network element from the communication channel. In one embodiment, the notification, in addition to indicating the change, also indicates at least one detail about the packet forwarding configuration of the network element after the change.

The controller also has the record 1256 of the packet forwarding configuration of the network element. In various aspects, the record may be a substantial copy or replica of the packet forwarding configuration (e.g., a copy or replica of a flow table), a database or information base (e.g., a forwarding information base) including the information from the packet forwarding configuration. Conventional approaches used by OpenFlow controllers to record information about flow tables of OpenFlow switches are suitable.

The controller also has an update module 1258. The update module is operable to update the record of the packet forwarding configuration to reflect the change indicated by the notification 1221.

The controller is operable to receive any of the various types of notifications previously described over the interface. As one example, the controller may receive the notification that is sent in the method of FIG. 7 and/or may receive the packet forwarding configuration change notification message 821 of FIG. 8. In such an example, the controller may have previously sent a given packet forwarding configuration modification message specifying a modification to the packet forwarding configuration of the network element. As shown, the controller includes a message generation module 1259 to generate such a message. In such an example, the notification of the change 1221 received by the controller may include an indication of, or a modification specified by, the given packet forwarding configuration modification message. The modification specified by the given message may be different than the change indicated in the notification 1221 received by the controller. As another example, the controller may receive the notification that is sent in the method of FIG. 9 and/or may receive the packet forwarding configuration change notification message 1021 of FIG. 10. In such an example, the notification may indicate that one or more ports are unavailable and indicate or identify one or more replacement ports to replace the one or more unavailable ports.

Referring again to FIG. 12, in one embodiment, the controller may optionally have a change authorization module 1260. The change authorization module may be capable of explicitly either allowing or denying changes to packet forwarding configuration modification messages or commands that the controller sends to the network element. That is, the controller may explicitly control whether or not its packet forwarding configuration modification messages may be revised, altered, updated, or otherwise changed by the network element or a virtualization entity.

In one embodiment, such explicit control may have a scope of a single or individual packet forwarding configuration modification message or command. For example, the packet forwarding configuration modification message may contain a flag (e.g., one or more bits) that may be given a first value to specify that modification of the message is allowed, or a second value to specify that modification of the message is not allowed. In another embodiment, such explicit control may have a scope of multiple packet forwarding configuration modification messages or commands (e.g., all messages or commands sent during a certain period, for example, during a lifetime of a network element configuration session or for an established connection). In one aspect, another flag (e.g., one or more bits) applicable to the multiple commands may be given a first value to specify that modification of the multiple commands is allowed or a second value to specify that modification of the multiple commands is not allowed or is denied. In one embodiment, such a flag may be given such values through a general network element configuration command issued during a configuration session establishment process during an initial handshake procedure. One example of such a message for OpenFlow is an OFPT_SET_CONFIG message.

In one embodiment, the controller may optionally have a notification request module 1261. The notification request module may be capable of explicitly either requesting or not requesting notification or feedback about changes to the packet forwarding configuration of the network element. Requesting feedback is to be interpreted broadly to encompass specifying or commanding that feedback be sent. Accordingly, the controller may enable or disable the notifications of changes from the network element.

In one embodiment, such explicit control may have a scope of a single or individual packet forwarding configuration modification message or command. For example, the packet forwarding configuration modification message may contain a flag (e.g., one or more bits) that may be given a first value to specify that feedback or notification about changes to the message is requested, or a second value to specify that feedback or notification about changes to the message is not requested. In another embodiment, such explicit control may have a scope of multiple packet forwarding configuration modification messages or commands (e.g., all messages or commands sent during a certain period, for example, during a lifetime of a network element configuration session or for an established connection). In one aspect, another flag (e.g., one or more bits) applicable to the multiple commands may be given a first value to specify that feedback or notification about changes to the message is requested, or a second value to specify that feedback or notification about changes to the message is not requested. In one embodiment, such a flag may be given such values through a general network element configuration command issued during a configuration session establishment process during an initial handshake procedure. One example of such a message for OpenFlow is an OFPT_SET_CONFIG message.

FIG. 13 is a block diagram illustrating an example embodiment of an OFPT_SET_CONFIG message 1365 for the OpenFlow protocol which has flags to configure modification and notification behavior in the network element with a scope of multiple messages. The message has an M flag that is operable to explicitly allow or denying changes or modifications to packet forwarding configuration modification messages sent by the controller to the network element. The message also has an F flag that is operable to explicitly request or not request notification or feedback on changes to the packet forwarding configuration of the network element. In another embodiment, either but not both of these flags may be included (i.e., these aspects are separable). The M and F flags in the illustrated embodiment are each one bit allocated from the ofp_config_flags field 1367 of the ofp_switch_config struct of the OFPT_SET_CONFIG message, although this is not required. The M flag is bit 2 and the F flag is bit 3 in this particular example, although this is not required. The RFG flag is conventional to the OpenFlow protocol. The positioning of the M and F flags adjacent to the RFG flag as shown in this particular example also not required. The message also has version 1330, type 1331, length 1332, xid 1333, and miss send len 1366 fields, which are conventional to OpenFlow, and which are not necessary to understanding the embodiment. The M and F flags, or similar flags, may alternatively be included in other types of messages.

FIG. 14 is a block diagram illustrating an example embodiment of an OFPT_FLOW_MOD message 1470 for the OpenFlow protocol which has flags to configure modification and notification behavior in the network element with a scope of a single message. As before, the message has an M flag that is operable to explicitly allow or denying changes or modifications to packet forwarding configuration modification messages sent by the controller to the network element. The message also has an F flag that is operable to explicitly request or not request notification or feedback on changes to the packet forwarding configuration of the network element. In another embodiment, either but not both of these flags may be included (i.e., these aspects are separable). The M and F flags in the illustrated embodiment are each one bit allocated from the ofp_flow_mod_flag extended flags field of the message, although this is not required. The M flag is bit 3 and the F flag is bit 4 in this particular example, although this is not required. The flags R, O, and E are conventional to OpenFlow. The positioning of the M and F flags adjacent to the R, O, and E flags as shown in this particular example is also not required. The M and F flags, or similar flags, may alternatively be included in other types of messages.

The illustrated messages of FIGS. 13 and 14 are only illustrative examples, and are not required. These messages are suited for the OpenFlow protocol, and have various OpenFlow protocol specific details (e.g., fields, bit assignments, etc.). These details are not required for other protocols. Accordingly, it is to be appreciated that fields may be omitted, replaced, renamed, combined with other fields, rearranged, expanded, shrunk, etc. Moreover, content may be added, omitted, separated into two or more different messages, etc.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods shown in the Figure and described above can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a network element, for notifying a controller of a change to a packet forwarding configuration of the network element, where the network element is separated from the controller by a communication channel, the method comprising:
  receiving packet forwarding configuration modification messages from the controller over the communication channel that are operable to control the network element to modify the packet forwarding configuration;
  determining the change to the packet forwarding configuration of the network element, wherein the packet forwarding configuration specifies how packets are to be forwarded by the network element and specifies to which ports of the network element the packets are to be forwarded; and
  actively notifying the controller of the change to the packet forwarding configuration by sending a message to the controller over the communication channel, the message in addition to indicating the change also indicating at least one detail about a portion of the packet forwarding configuration after the change, wherein the at least one detail comprises a detail of a flow entry in the flow table after the change, wherein each flow entry includes header fields, counters, and zero or more data forwarding actions to apply to a packet that matches the header fields, and wherein the message containing the detail of the flow entry after the change is sent to the controller without explicit instruction from the controller.

2. The method of claim 1, further comprising:
receiving a packet forwarding configuration modification message from the controller over the communication channel, the packet forwarding configuration modification message specifying a modification to the packet forwarding configuration of the network element, and
wherein determining the change to the packet forwarding configuration comprises determining the change to the packet forwarding configuration that is different than the modification specified by the message.

3. The method of claim 2, wherein actively notifying the controller which is an OpenFlow controller comprises sending the message that includes:
one of: (a) an identification of the packet forwarding configuration modification message; and (b) the modification specified by the packet forwarding configuration modification message; and
a second packet forwarding configuration modification message, the second packet forwarding configuration modification message specifying the change to the packet forwarding configuration.

4. The method of claim 2, wherein actively notifying the controller which is an OpenFlow controller comprises sending the message indicating a reason for the change, the reason selected from a group consisting of:
(a) the packet forwarding configuration modification message was invalid;
(b) the packet forwarding configuration modification message was changed to improve performance of the network element; and
(c) the packet forwarding configuration modification message was translated by a virtualization entity.

5. The method of claim 1, further comprising:
detecting a flow changing event within the network element by the network element, and
wherein determining the change includes the network element determining to change the packet forwarding configuration, without explicit instruction from the controller, based on the detection of the flow changing event.

6. The method of claim 5, wherein detecting the flow changing event comprises detecting that a port associated with a flow is unavailable, wherein determining the change includes determining a replacement port for the port that is unavailable, and wherein sending the message indicating the at least one detail includes sending the message indicating the replacement port for the flow.

7. The method of claim 1, wherein determining the change comprises determining the change based on information internal to the network element that is not available to the controller, and further comprising adding a flow entry to a flow table based on a message received from the controller, the flow entry indicating a port to which a packet associated with the flow entry is to be forwarded.

8. The method of claim 1, wherein determining the change to the packet forwarding configuration comprises determining the change to a flow table that includes flow entries, each flow entry including header fields, counters, and zero or more data forwarding actions to apply to a packet that matches the header fields, and wherein the at least one detail comprises a detail of a flow entry in the flow table after the change.

9. The method of claim 1, wherein the method is performed within the network element which is OpenFlow enabled, wherein actively notifying the controller is not in response to a query from the controller, wherein detecting the change comprises detecting the change that is not merely a deletion of a portion of the packet forwarding configuration, and wherein the detail comprises the detail of an entry of a flow table after the change that is one of a changed header field that packets are to be compared against, a changed packet forwarding action that is to be applied to matching packets, and a changed output port to be used for forwarding.

10. A network element, the network element operable to be coupled with a controller by a communication channel, the network element operable to notify the controller of a change to a packet forwarding configuration of the network element, the network element comprising:
an interface to the communication channel;
the packet forwarding configuration, wherein the packet forwarding configuration specifies how packets are to be forwarded by the network element and specifies to which ports of the network element the packets are to be forwarded;
a configuration change determination module coupled with the packet forwarding configuration, the configuration change determination module operable to determine the change to the packet forwarding configuration of the network element; and
a notification module coupled with the configuration change determination module, the notification module operable to notify the controller of the change to the packet forwarding configuration by sending a message to the controller over the communication channel through the interface, the message in addition to indicating the change also indicating at least one detail about a portion of the packet forwarding configuration after the change, wherein the at least one detail comprises a detail of a flow entry in the flow table after the change, wherein each flow entry includes header fields, counters, and zero or more data forwarding actions to apply to a packet that matches the header fields, and wherein the message containing the detail of the flow entry after the change is sent to the controller without explicit instruction from the controller.

11. The network element of claim 10,
wherein the interface is operable to receive a packet forwarding configuration modification message from the controller over the communication channel, the packet forwarding configuration modification message operable to specify a modification to the packet forwarding configuration, and
wherein the configuration change determination module is operable to determine the change to the packet forwarding configuration that is different than the modification specified by the packet forwarding configuration modification message.

12. The network element of claim 11, wherein the notification module comprises a message generation module, the message generation module operable to generate the message to be sent that includes:
one of: (a) an identification of the packet forwarding configuration modification message; and (b) the modification specified by the packet forwarding configuration modification message; and
a second packet forwarding configuration modification message, the second packet forwarding configuration modification message specifying the change to the packet forwarding configuration.

13. The network element of claim 10, wherein the network element is OpenFlow enabled and is operable to detect a flow changing event within the network element, and wherein the configuration change determination module is operable to determine to change the packet forwarding configuration, without explicit instruction from the controller, based on the detection of the flow changing event.

14. The network element of claim 13, wherein the network element is operable to detect that a port associated with a flow is unavailable as the flow changing event, wherein the configuration change determination module is operable to determine a replacement port for the port that is unavailable, and wherein the notification module is operable to indicate the replacement port in the message sent to the controller.

15. The network element of claim 10, wherein the packet forwarding configuration comprises a flow table that includes flow entries, each flow entry including header fields, counters, and zero or more data forwarding actions to apply to a packet that matches the header fields, and wherein the network element is to add a flow entry to the flow table in response to a message from the controller which includes a header field and an indication of a port where a packet that matches the header field is to be forwarded, and wherein the detail comprises a detail of a flow entry of the flow table after the change.

16. A method performed by a controller of a network element, for updating a record of a packet forwarding configuration of the network element that is maintained by the controller, where the controller is separated from the network element by a communication channel, the method comprising:
    receiving a notification of a change to the packet forwarding configuration of the network element over the communication channel, wherein the packet forwarding configuration specifies how packets are to be forwarded by the network element, and wherein the notification, in addition to indicating the change, also indicates at least one detail about a portion of the packet forwarding configuration of the network element after the change, wherein the at least one detail comprises a detail of a flow entry in the flow table after the change, wherein each flow entry includes header fields, counters, and zero or more data forwarding actions to apply to a packet that matches the header fields, and wherein the message containing the detail of the flow entry after the change is sent to the controller without explicit instruction from the controller; and
    updating the record of the packet forwarding configuration to reflect the change, wherein the controller is to maintain the record of the packet forwarding configuration of the network element including to which ports of the network elements the packets are to be forwarded.

17. An OpenFlow controller of a network element, the OpenFlow controller operable to be coupled with the network element by a communication channel, the OpenFlow controller operable to update a record of a packet forwarding configuration of the network element that is maintained by the OpenFlow controller, the OpenFlow controller comprising:
    an interface to the communication channel, the interface operable to receive a notification of a change to the packet forwarding configuration of the network element from the communication channel, wherein the notification, in addition to indicating the change, also indicates at least one detail about a portion of the packet forwarding configuration of the network element after the change, wherein the at least one detail comprises a detail of a flow entry in the flow table after the change, wherein each flow entry includes header fields, counters, and zero or more data forwarding actions to apply to a packet that matches the header fields, and wherein the message containing the detail of the flow entry after the change is sent to the controller without explicit instruction from the controller;
    the record of the packet forwarding configuration of the network element, wherein the packet forwarding configuration specifies how packets are to be forwarded by the network element; and
    an update module coupled with the record of the packet forwarding configuration to update the record of the packet forwarding configuration to reflect the change indicated by the notification.

18. The OpenFlow controller of claim 17, further comprising a change authorization module that is operable to in one instance send a first message to the network element to allow changes to a packet forwarding configuration modification message sent from the OpenFlow controller to the network element, and in another instance send a second message to the network element to deny changes to the packet forwarding configuration modification message sent from the OpenFlow controller to the network element.

19. The OpenFlow controller of claim 17, further comprising a change notification request module that is operable to send a message to the network element to request that the network element provide notification of changes to multiple packet forwarding configuration modification messages sent by the OpenFlow controller to the network element.

20. The network element of claim 10, wherein the network element is OpenFlow enabled and wherein the controller comprises an OpenFlow controller, wherein the configuration change determination module is to determine the change which is not merely a deletion of a flow entry, and wherein the notification module is operable to notify the controller of the change not in response to a read-state message from the controller requesting information.

21. The network element of claim 10, wherein the configuration change determination module and the notification module comprise an OpenFlow agent, and wherein the configuration change determination module and the notification module each comprise at least one of hardware, software, and firmware.

22. The method of claim 16, further comprising the controller sending a message, which is an OpenFlow protocol message, to the network element to one of allow and deny changes to a packet forwarding configuration modification message sent from the controller to the network element.

23. The method of claim 16, wherein receiving the notification comprises receiving an OpenFlow protocol message, and further comprising the controller sending a message to the network element to request that the network element provide notification of changes to multiple packet forwarding configuration modification messages sent by the controller to the network element.

24. The OpenFlow controller of claim 17, wherein the update module comprises at least one of hardware, software, and firmware.

* * * * *